Nov. 22, 1927. 1,650,016
R. F. JOHNSON
AUTOMOBILE JACK
Filed Nov. 10, 1926
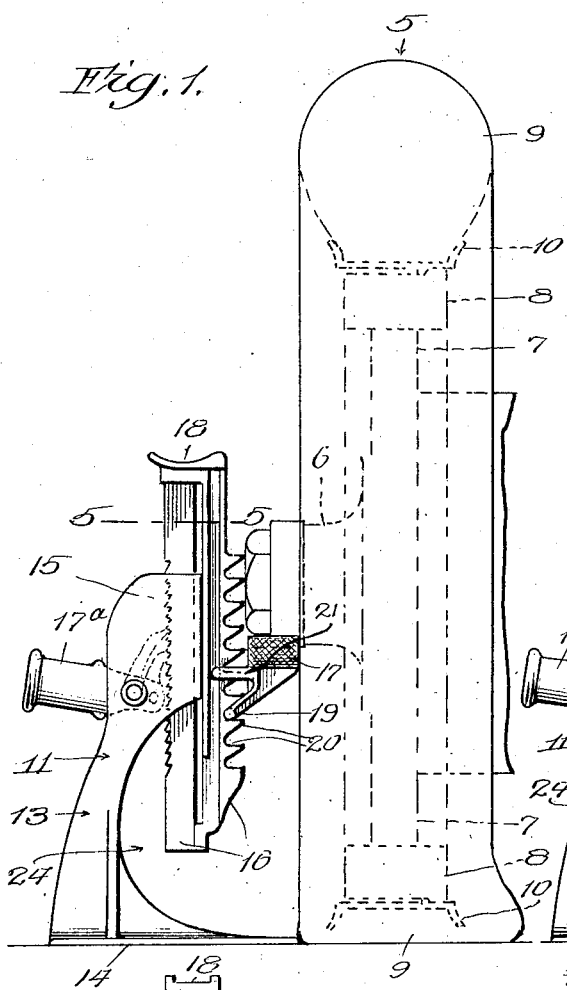
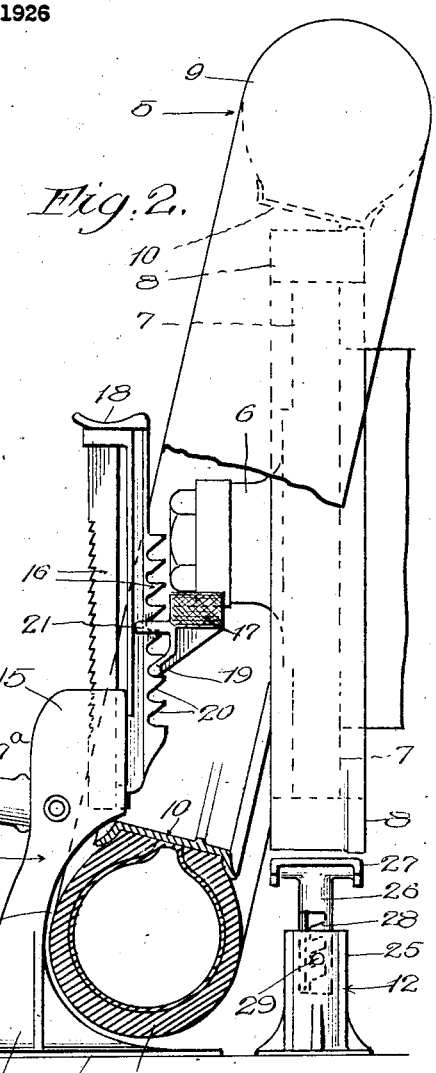
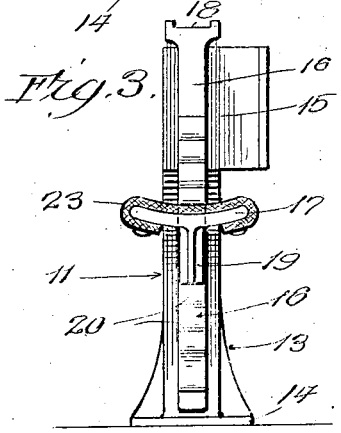
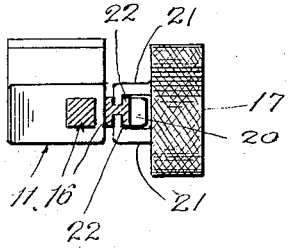
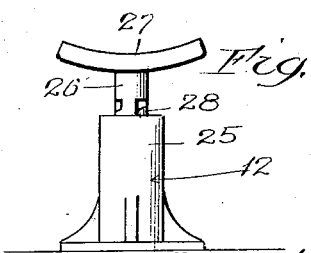
Inventor:
Richard F. Johnson,
by Charles Sherry
his Atty.

Patented Nov. 22, 1927.

1,650,016

UNITED STATES PATENT OFFICE.

RICHARD F. JOHNSON, OF SAN ANTONIO, TEXAS.

AUTOMOBILE JACK.

Application filed November 10, 1926. Serial No. 147,422.

This invention relates to means for facilitating the removal and replacement of tires on vehicle wheels, and its principal object is to provide improved means in the form of a lifting jack having lifting means capable of engagement with the hub of a vehicle wheel and so constructed and arranged as to permit the tire and its mounting to be detached from the felloe or hub of the wheel while the lifting means is in supporting engagement with the hub.

It is well known that the task of placing a jack under either axle of an automobile or other motor vehicle is irksome, tedious and unpleasant and that one is apt to get his clothes soiled, while placing the jack in such lifting position. One of the objects of this invention is to dispense the necessity of placing the lifting jack underneath the car, whereby the objectionable features of using the ordinary lifting jack are eliminated. Another object is to provide means, including a lifting jack of novel construction which is applied to the wheel hub for the purpose of lifting it, in connection with an auxiliary support which may be applied underneath the wheel felloe, the hub, brake drum or other convenient place to temporarily support the corner of the vehicle from which the tire is to be removed.

The invention consists therefore, in means for facilitating the removal and replacement of tires, demountable wheels or disc wheels with their tires, and having wheel lifting means engageable with the hub of the wheel, and a standard, of a form enabling the tire, or other demountable element to be partly detached from the felloe, or hub and moved out of its normal plane, whereby an auxiliary support may be placed in position to support that corner of the vehicle from which the tire or other demountable part is to be disconnected from the vehicle. It further consists in the several novel features hereinafter fully set forth and claimed.

The invention is clearly illustrated in the accompanying drawing, in which:

Fig. 1 is a side elevation of the device showing its application to a vehicle wheel from which the tire is to be removed; Fig. 2 is a view similar to Fig. 1 but showing the wheel in raised position with its tire partly detached therefrom and the auxiliary support in place to support the corner of the vehicle from which the tire is to be removed; Fig. 3 is an end elevation of the device seen in Fig. 1; Fig. 4 is a side elevation of the auxiliary support, and Fig. 5 is a cross section taken on line 5—5 of Fig. 1.

Referring to said drawing, which illustrates one embodiment of the invention, the reference character 5 designates an automobile wheel having the hub 6, spokes 7, felloe 8 and the tire 9 and its mounting, or rim 10.

In its present form the invention embodies a lifting jack 11 of novel construction and an auxiliary supporting device 12. The lifting jack comprises a standard 13 which rises from a base 14, which is preferably rectangular in form, and flat on its bottom. The standard 13 rises from one end of the base 14 and its upper end is in the form of a housing 15 in which is slidably guided a vertically movable lifting bar 16, which has a hub engaging member or rest 17 adjustably secured thereon. As usual, means are provided in the housing for raising and lowering the bar 16, but inasmuch as such means are common and well known they will not be described in detail. A handle socket 17ª is included in such raising and lowering means, into which is placed a handle (not shown) by which the lifting mechanism is actuated. On the top of the lifting bar 16 a rest 18 may be provided whereby the device may be used as an ordinary jack for any lifting purpose.

The hub rest 17, in the form shown, has an arm 19 which engages with any one of a number of teeth 20, which are formed on the lifting bar 16 and it also has two arms 21 that engage with ribs 22 on the lifting bar 16. The hub rest may be adjusted to any desired position on the lifting bar 16 by swinging the arm 19 out of engagement with the tooth with which it is engaged and raising and lowering the hub rest to the desired place and letting the arm 19 re-engage an adjacent tooth.

To enable the vehicle wheel to be rotated while being supported by the lifting jack, the upper face of the hub rest is depressed and given an arcuate form, and the depressed portion is faced with a facing 23 preferably composed of strong woven material such as brake band or transmission lining impregnated with grease or other lubricant or anti-friction substance, the purpose of which is to render the hub rest smooth whereby the wheel, when resting thereon may be turned or rotated to bring the valve of the tire into an uppermost position, which is the proper position for it to occupy while removing a tire from the wheel. The facing 23 is usually riveted to the hub rest but may be secured thereto in any desirable manner.

The standard 13, between the base plate 14 and housing 15 is arched in a backward direction from the lifting bar 16, or at least set back therefrom so as to leave a free and unobstructed clearance space 24 below the bar 16 when the latter is raised whereby the lower portion of the tire and its mounting may be swung into said space, preparatory to being wholly removed from the felloe of the wheel. The hub rest is placed directly above the base plate whereby there will be no tendency for the vehicle to tilt the lifting jack when its weight is borne thereby.

The auxiliary supporting member 12 may be in any convenient form and as shown comprises a hollow base member 25 in which is adjustably supported a post 26 having on its upper end, an arcuate rest 27. The adjustable feature may be provided by forming teeth 28 in the post 26 which engage with a pin 29 secured in the hollow base member. By partially rotating the post, the teeth can be disconnected from the pin and it may then be raised or lowered and turned back to bring another tooth into engagement with the pin 29.

In using the device for changing a tire, the lifting jack is placed at the outerside of the wheel with the hub rest underneath the wheel hub and the hub rest adjusted vertically so as to bring it as close to the underside of the hub as can be done conveniently. The handle of the jack is then manipulated until the wheel has been raised sufficiently to clear the ground or other supporting surface upon which it has been standing. The fastening means for the tire rim are then disconnected and the wheel turned around until the tire valve is located at the top of the wheel. The lower part of the tire is then swung into the space 24 underneath the lifting bar 16, in which position it is suspended by the top of the felloe, and the auxiliary supporting member 12 is then inserted underneath the felloe, or brake drum, or other convenient place. As a preference the auxiliary support should be adjusted to such a length that it will support the corner of the vehicle from which the tire is to be removed, when that corner of the vehicle is lowered a half an inch or so, in order to save time and labor in the work of changing the tire. The lifting jack handle is then manipulated to lower the lifting bar, the hub rest and vehicle wheel until the weight is borne by the auxiliary supporting member, whereupon the lifting jack is lifted away from the wheel, and the tire and its rim detached from the felloe. A substitute tire and rim are then placed on the felloe with the tire valve in the hole therefor in the felloe and the lower part of the tire and rim at one side of the auxiliary supporting member. The lifting jack is again brought into play, the hub rest placed under the wheel hub in its raised position, the jack manipulated to take the load from the auxiliary supporting member, the latter removed, and the tire and rim placed around the felloe and fastened in place, whereupon the lifting jack may be removed. When used for removing tires from disc wheels, the operation is the same, except that the auxiliary support is placed under an associated part of the wheel, from which the disc is removed, or it may be placed under the brake drum, axle or other accessible part. From the above it is quite evident that a tire and its mounting may be removed from and replaced on a wheel felloe, without the necessity of placing a jack underneath the body of an automobile; that the work of changing tires is simplified and is not attended with the usual danger of soiling one's clothes. The device has been found to be particularly serviceable in connection with low pressure tires, commonly called "balloon" tires, but its use is not limited thereto. Moreover the jack may be used as an ordinary jack wherever lifting of a heavy object is necessary.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. Means for facilitating the removal of and replacement of tires on vehicle wheels, comprising a lifting jack, formed with a base plate and a standard extending up therefrom and having a housing at its upper end, a vertically movable lifting bar slidably guided in said housing, a hub rest carried by said bar, and bar lifting mechanism, the lower portion of said standard being spaced entirely behind said bar, and there being sufficient clearance space below and behind said bar, when raised, to receive the tire of a wheel supported by said hub rest.

2. Means for facilitating the removal of and replacement of tires on vehicle wheels, comprising a lifting jack, formed with a base plate and a standard extending up therefrom and having a housing at its upper end, a vertically movable lifting bar slidably guided in said housing, a vertically adjustable hub rest carried by said bar, and bar lifting mechanism, the lower portion of said standard being spaced entirely behind said bar, and there being sufficient clearance space below and behind said bar, when raised, to receive the tire of a wheel supported by said hub rest.

3. Means for facilitating the removal of and replacement of tires on vehicle wheels, comprising a lifting jack, formed with a base plate and a standard extending up therefrom and having a housing at its upper end, a vertically movable lifting bar slidably guided in said housing, a hub rest carried by said bar, and bar lifting mechanism, the lower portion of said standard being arched backwardly and spaced entirely behind said bar, and there being sufficient clearance space below and behind said bar, when raised, to receive the tire of a wheel supported by said hub rest.

4. Means for facilitating the removal of and replacement of tires or vehicle wheels, comprising a lifting jack, formed with a base plate and a standard extending up therefrom and having a housing at its upper end, a vertically movable lifting bar slidably guided in said housing, a hub rest carried by said bar, and bar lifting mechanism, the lower portion of said standard being arched backwardly to receive the tire of a wheel when raised and supported by said hub rest.

5. Means for facilitating the removal of and replacement of tires on vehicle wheels, comprising a lifting jack, having a standard, a vertically movable hub rest, and lever operated means mounted on the standard for raising the hub rest, the lower portion of said standard being spaced sufficiently behind the hub rest to provide clearance space for receiving the tire of a wheel when raised and supported by said hub rest, and a vertically adjustable auxiliary support engageable with the felloe of the wheel when the tire has been moved into the clearance space of the lifting jack.

RICHARD F. JOHNSON.